United States Patent [19]

Gray et al.

[11] 3,746,471
[45] July 17, 1973

[54] WATER PRESSURE BOOSTER SYSTEM USING AUXILIARY PUMP TO SUPER CHARGE PRESSURIZED RESERVOIR

[75] Inventors: John Gray, Oak Park; Gene W. Anderson, Downers Grove, both of Ill.

[73] Assignee: Liqui-Trol Systems, Inc., Aurora, Ill.

[22] Filed: Nov. 8, 1971

[21] Appl. No.: 196,575

[52] U.S. Cl. .................... 417/7, 417/12, 417/38, 417/43, 417/44
[51] Int. Cl. ...................... F04b 41/02, F04b 41/06
[58] Field of Search ..................... 417/6, 7, 12, 38, 417/43, 44

[56] References Cited
UNITED STATES PATENTS

| | | | |
|---|---|---|---|
| 1,972,812 | 9/1934 | Wooley | 417/7 |
| 3,511,579 | 5/1970 | Gray et al. | 417/6 |
| 3,639,081 | 2/1972 | Gray et al. | 417/7 |

Primary Examiner—Carlton R. Croyle
Assistant Examiner—Richard Sher
Attorney—James J. Hill

[57] ABSTRACT

A water pressure booster system includes a plurality of main pumps which are sequenced according to system demands to maintain the pressure in a discharge conduit at a constant level for all flow rates. An auxiliary pump having a small capacity but capable of developing a high pressure head at low flow rates is connected to the output of one of the main pumps to feed a pressurized reservoir. Control circuitry sensing both the flow rate in the input conduit and the gas pressure in the pressurized reservoir de-energizes all pumps only when the flow is below a predetermined minimum level and the gas pressure within the pressurized reservoir is above a predetermined level sufficient to maintain the desired discharge or system pressure. When all pumps are off, the reservoir supplies system demand until the pressure in the reservoir falls below a predetermined level. The auxiliary pump, by drawing suction from one of the main pump's output, increases the pressure in the reservoir to a much higher level, thereby permitting the use of a smaller reservoir for the same usable volume of water and also permitting the use of split case pumps as the main pumps.

9 Claims, 3 Drawing Figures

PATENTED JUL 17 1973   3,746,471

Inventors:
John Gray
Gene W. Anderson
By: James J. Hill
Atty.

WATER PRESSURE BOOSTER SYSTEM USING AUXILIARY PUMP TO SUPER CHARGE PRESSURIZED RESERVOIR

BACKGROUND

1. Field of the Invention

The present invention relates generally to water pressure booster systems employing constant speed pumps and designed to maintain a constant higher output pressure for all conditions of flow over a design range. More specifically it applies to such systems employing a reservoir containing both water and an enclosed volume of gas (such as air) at pressures in excess of the desired system pressure which, under minimal or zero flow conditions, permits de-energizing all pumps until the pressure in the reservoir falls to a set pressure slightly above desired system pressure.

2. Prior Systems

Water pressure booster systems of the constant-speed, reservoir type use a reservoir containing both water and an enclosed volume of gas. The reservoir inlet/outlet is coupled into the system at a location between the outlet of a pump and its associated pressure regulating valve so that the flow from the reservoir also flows through the pressure regulating valve. The pumps are all shut off when the flow at the inlet conduit and the pressure in the reservoir exceeds a preset level which is higher than the start up reservoir pressure.

A pressure-responsive switch in the reservoir starts one pump when the pressure falls below a predetermined value. Thus, the pressure-responsive switch in the reservoir requires a hysteresis characteristic of widely-separated pressures—closing at a relatively low pressure and opening at a relatively high pressure.

A flow device operates the pumps continuously and independently of the pressure switch when the system demand exceeds a predetermined level. A system which incorporates these characteristics and is an improvement over prior systems is disclosed in our co-pending application for "Liquid Pressure Booster System with Cut-Off for Minimum Flow Levels," Ser. No. 788,574, filed Jan. 2, 1969, now U.S. Pat. No. 3,639,081.

The hysteresis operation of the pressure switch in the reservoir, as described above, requires that the pumps develop a sufficiently high pressure at low flow conditions above the design system operating level that it be capable of opening the pressure-responsive switch in the reservoir. These systems, therefore, have normally required the use of a pump having a "steep head" characteristic—that is, at low flow rates, the pump must develop a relatively high pressure in order to adequately charge the reservoir.

Such systems normally have employed a centrifugal pump (sometimes referred to as a "vertical turbine pump") because of the steep head-capacity characteristic that it has at low flow levels. Conventional split case pumps have not been employed in commercial systems of this type because they do not develop sufficient pressure differential at the low flow rates, even though their operating characteristics are otherwise satisfactory and they are much less expensive than the "step-head" centrifugal pumps. That is to say, heretofore it has been undesirable to use a low head pump such a split case pump, because the added head it develops over system design pressure at low flow rates is so small that it would require the use of a very large reservoir in order to accommodate adequate system flow during times when the pumps are off. A steep head pump, such as a vertical turbine centrifugal pump, develops a sufficiently high pressure head at low flow rates that the size of the reservoir, which is designed to supply a predetermined percentage of design system flow when the pumps are off, becomes feasible.

SUMMARY

In the present system, there are at least two main pumps which are sequenced according to system demands. The main pumps are shut off when the flow level is reduced to a predetermined minimum and the pressure in a reservoir, which supplies system requirements when the main pumps are shut off, is above a preset high level above the system design pressure.

A small auxiliary pump, sometimes referred to as a "super charge" pump, with a relatively small capacity but exhibiting a high pressure head at low flow rates, has its input connected to the output of the lead pump; and it feeds the reservoir.

A pressure-responsive switch sensing the pressure in the reservoir generates a first signal when the pressure falls below a preset level (which is slightly above the desired constant system output pressure) and a second signal when the pressure exceeds a second preset level (well above the desired system pressure). The first signal turns the lead pump on; and the second signal in combination with another signal indicative of a minimum flow level turns the main pumps as well as the auxiliary pump off.

In a preferred embodiment, the motor of the super charge pump is connected in parallel electrically with the control circuitry of the lead main pump. If the flow to the system through the input conduit is minimal or zero as determined by a flow metering means, and the pre-charged reservoir pressure is above its preset higher level, then the control circuitry for sequencing the pumps is de-energized, and the driving motors of all of the pumps are disconnected. Thus, under conditions of minimum or no flow, the constant speed pumps are de-energized, while at the same time, the system output pressure is not diminished.

Time delay mechanism continues to energize the lead main pump and the super charge pump even after this shut off condition exists in order to increase the available capacity and pressure of the reservoir. A flow meter means senses the flow in the input conduit to sequence the pumps in a predetermined order in response to the demand as seen at the suction side of the pumps.

If the pumps are off and demand is being supplied only by the reservoir, no pumps will be turned on until the pressure in the reservoir falls below a preset level which is above the desired constant discharge pressure. In other words under minimal flow conditions when the pumps are shut off, the sequencing on of the lead pump and supercharge pump is determined by the pressure level of the water in the reservoir and it is independent of the discharge flow rate into the system.

In the instant system the lead pump and the super charge pump are energized to charge the reservoir when the reservoir pressure falls to its predetermined level above the desired system pressure; and once energized, the super charge pump and the lead pump will run for a predetermined time after the reservoir pressure has returned to its preset level. Thus, if the suction pressure increases, the lead pump, by virtue of its design capacity will take advantage of this increase and thereby increase the suction pressure to the super charge pump which by virtue of its design capacity will increase the output pressure and charge the reservoir to an even higher pressure and greater available capacity because it is left energized for a minimum predetermined time.

The auxiliary pump operates in series mechanically with the lead pump (although they are connected in parallel electrically) to charge the reservoir to a pressure equal to the sum of the pressures developed by the lead pump and the auxiliary pump. The present invention substantially increases the output pressure of the reservoir above the head-capacity characteristic of the lead pump. The differential between a normal flat head curve or even a steep head curve of the lead pump may be doubled, if desired, with a power increase of only 10 percent.

By charging the pressurized reservoir to a much higher pressure than has heretofore been employed, the physical size of the reservoir is reduced substantially while permitting the reservoir to supply the same usable volume of water as has been supplied in prior systems using only lead pumps. Further, with the present system, end-split case pumps may be used in a pressurized reservoir system despite the fact that they have a flat head characteristic at low capacities. This permits the use of main pumps which are much less expensive than the steep head turbine pumps mentioned above, while, at the same time, more than offsetting the additional capital cost required for the small auxiliary pump. With the present invention, a design engineer no longer has to specify a pump of larger capacity in order to obtain a suitable head at low flow levels.

Other features and advantages of the present invention will be apparent to persons skilled in the art from the following detailed description of a preferred embodiment accompanied by the attached drawing which illustrates one embodiment of the invention but is not to be taken as limiting the scope of the invention.

THE DRAWING

DETAILED DESCRIPTION

Figure 1:
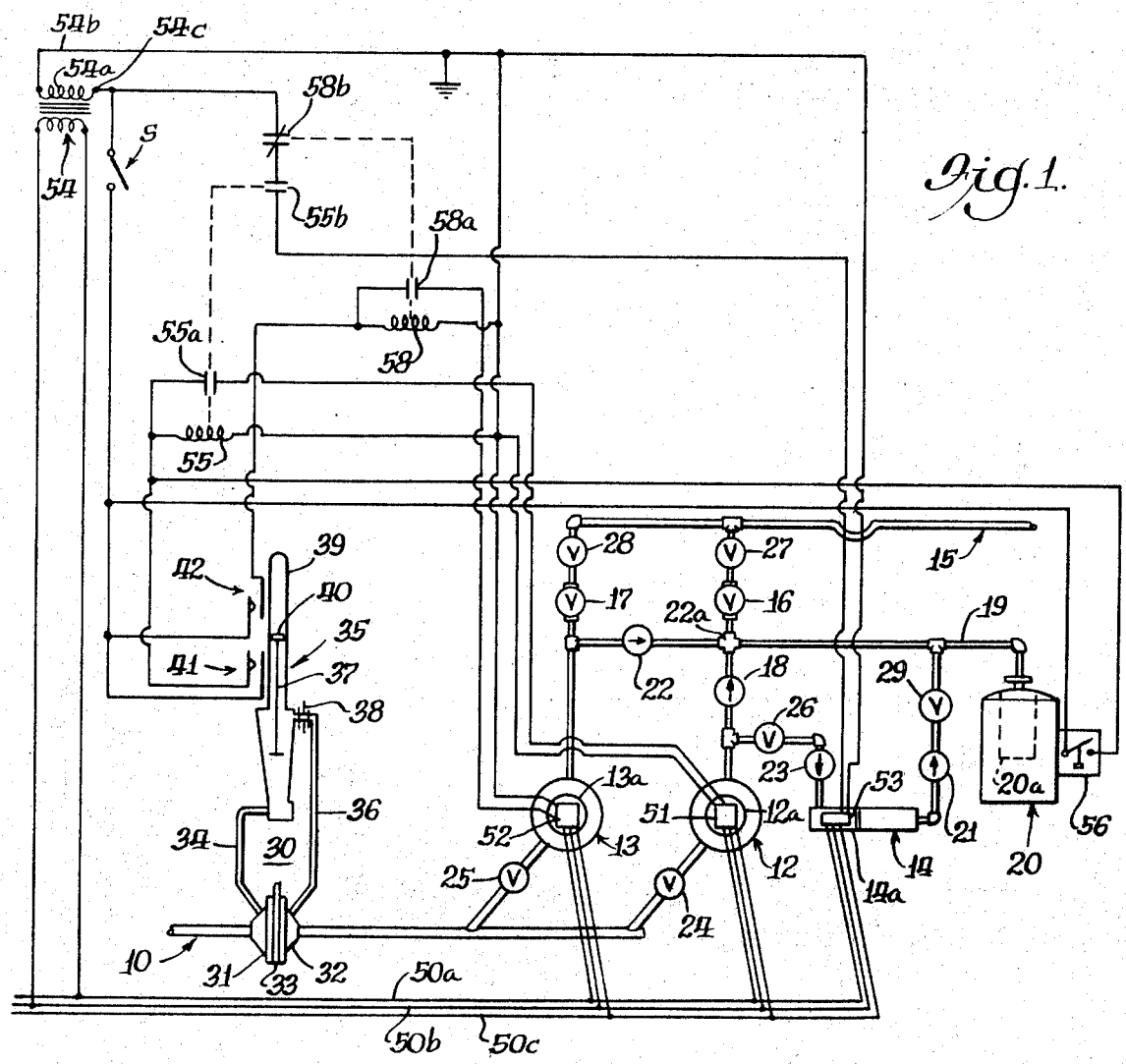
FIG. 1 is a combined circuit and system schematic diagram of a control system according to the present invention.

Turning now to FIG. 1, there is seen in diagrammatic form, a system constructed according to the present invention. An inlet conduit or header 10 is coupled to a source of water.

Two main pumps, indicated respectively by reference numerals 12 for the lead main pump and 13 for the lag main pump, receive water from the header 10. The pumps 12 and 13 are connected for parallel operation when both are energized; and the output of each of the main pumps 12, 13 is fed to an output or system conduit 15. Pressure regulating valves, generally designated 16 and 17 respectively are interposed between the output of the pumps 12 and 13, and the system conduit 15 to maintain a desired system pressure. Any number of pumps as well as any combination or different capacities may be used in accordance with the present invention; however, for clarity of understanding, a specific example will be presented.

An auxiliary or "super charge" pump designated 14 receives water from the outlet of the lead main pump 12 and discharges into a conduit 19 that communicates with a water reservoir or tank 20. The reservoir 20 includes a flexible cartridge 20a for storing the water while separating it from the air in the tank. More details may be obtained if desired from our application identified above. The conduit 19 also communicates the inlet of reservoir 20 with output of main pumps 12 and 13 upstream of their associated pressure regulating valves 16 and 17. The auxiliary pump 14 may be a small, low capacity pump, but it has a high head as will be discussed.

A check valve 18 is located in the outlet conduit of pump 12 downstream of the take-off for the inlet of the auxiliary pump 14. Another check valve 21 is located between the output of the auxiliary pump 14 and the conduit 19. A third check valve 22 is located between the output of the lag pump 13 and a junction 22a which communicates the output of pump 12 and the reservoir 20 with the discharge conduit 19. Check valves 18, 21 and 22 permit unidirectional flow of water from pumps 12, 13 and 14 into the flexible cartridge 20a of the reservoir 20 while permitting the reservoir and main pumps to supply the system demand in parallel. A check valve 23 permits a unidirectional flow of water from pump 12 into the inlet of auxiliary pump 14. While the inlet to auxiliary pump 14 is preferably taken from the outlet of the lead pump 12, it may also be taken directly from the inlet conduit 10 or the outlet of pump 13 or any or all of the main pumps.

In the illustrated embodiment, it is assumed that pumps 12 and 13 have capacities which are each about 65 percent of the design system output capacity. Other combinations may equally well be employed, for example, if three main pumps are used, the lead pump may have a capacity of 25 percent and the two lag pumps may have a capacity of 55 percent respectively of the design system output capacity. The illustrated system contemplates that pump 12 will operate up to about 65 percent of the system output capacity, thereafter pump 13 will be energized to operate in parallel and simultaneously with pump 12 from that point up to 100 per cent of the system output capacity.

The function of the pressure regulating valves 16 and 17 is to effect a pressure drop from the output pressure of its associated pump to maintain the pressure in the outlet conduit 15 at a constant, uniform level. Each of the pressure-regulating valves 16 and 17 conducts the flow of water only unidirectionally—that is in addition to regulating the outward pressure, the valves 16 and 17 act as check valves. Such unidirectional pressure regulating valves are commercially available.

Main pumps 12 and 13 as well as auxiliary pump 14 are constant speed pumps—that is, once energized, the motors (identified as 12a–14a respectively) powering pumps 12–14 drive them at constant speeds. It is desirable from the point of view of simplifying the control equipment to employ constant speed pumps in pressure booster systems.

Shut-off valves 24, 25 and 26 may be interposed in the inlet conduits of the respective pumps 12, 13 and 14. Similarly, shut-off valves 27, 28 and 29 may be interposed in the outlet conduits of each of the pumps 12, 13 and 14 for the purpose of isolating each of them individually, if desired, without interrupting the system operation.

Flow measuring means generally designated by reference numeral 30, is incorporated in the inlet header 10 for generating electrical signals representative of flow levels, which signals control the operation of the pumps as described below. The flow measuring means 30 includes an upstream tapped orifice flange 31 and a similar orifice flange 32 located downstream thereof. A straight edge orifice plate 33 is supported between the flanges 31 and 32. A conduit 34 is connected to the tapped orifice flange 31 and coupled to the bottom connection of a flow indicator generally designated 35. A return conduit 36 couples water passing up through the indicator 35 back to the inlet conduit via the tapped orifice flange 32. A stem 37 located within the indicator 35 is adapted for vertical movement as a function of water flow through the indicator 35. The vertical displacement of the stem 37 from a reference point is proportional to the pressure differential across the main orifice plate 33 and a bypass orifice 38 located in the return conduit 36. Thus the vertical location of the stem 37 is representative of flow through the indicator and hence, through the inlet header 10.

The indicator includes an upper wet well 39 which is non-magnetic. A cap 40 secured to the top of the indicator stem 37 is magnetic, however. Magnetically-actuated dry reed switches 41 and 42 are positioned at spaced vertical locations adjacent to the non-magnetic wet wall 39 to be actuated by the magnetic cap 40 of the indicator stem 37 at different flow levels. The switches 41, 42 remain closed as long as the flow exceeds the level at which they are closed. The reed switch 41 is set at a minimum low flow rate, for example 5-10 percent of the system design level. If the system flow is below the minimum level which closes the contacts of the switch 41, a signal will be generated which will shut off all pumps providing that the pressures in the reservoir tank is above a predetermined level which indicates that a sufficient pressure exists at the output of the lowest-capacity pump.

Switch 42 controls the sequencing of pump 13; and in the example heretofore given, switch 42 is closed when the flow level reaches 25 percent of design maximum. This point represents the maximum design capacity of pump 12.

Three power lines 50a, 50b and 50c receive electrical power from a conventional three-phase source and couple it to boxes 51, 52 and 53 which energize respectively motors 12a, 13a and 14a. It is to be understood that four-wire, three-phase or two-wire, single-phase may serve as the source of power; and it is not to be limited to three-wire, three-phase, as illustrated.

A transformer generally designated as 54, has a primary winding receiving energy from the power lines 50a and 50b; its secondary winding 54a provides power for energizing the control circuitry. One terminal of the transformer secondary 54a, for example the terminal 54b, may be considered to be grounded or common terminal; and the second terminal 54c may be considered as the "hot" terminal.

The previously mentioned switch 41, which is actuated by the indicator 35 when flow through conduit 10 reaches 5-10 percent of the design capacity, has one contact connected to the terminal 54c of secondary winding 54a and its second contact connected to the coil of a relay 55. The other terminal of relay coil 55 is grounded. Relay 55 includes two sets of normally open contacts 55a and 55b; and it is the type wherein the contacts close immediately when the coil is energized, but they open only after a predetermined time delay after the coil is de-energized. Contacts 55a are connected between the hot terminal of coil 55 and the ungrounded wire of starter box 51, the other wire of which is grounded. One terminal of contacts 55b is connected to the starter box 53 of the auxiliary pump 14. The other terminal of starter box 53 is connected to the ground terminal 54b.

A pressure-responsive switch 56 sensing pressure in tank 20 is connected in parallel electric circuit with the switch 41. When pressure in reservoir 20 is above a predetermined level, switch 56 is open. When flow in header 10 is below the previously mentioned 5-10 percent of design capacity, switch 41 is open. With both switches 41 and 56 open, all pumps are de-energized.

The relay 55, as mentioned, is a "time delay off" relay to permit the reservoir to be charged to a higher pressure after the system demand has fallen below the minimum level. That is, pumps 12 and 14 will continue to charge the reservoir for a predetermined time.

Previously mentioned switch 42 has one terminal connected to terminal 54c of secondary winding 54a. The other terminal of switch 42 is connected to a hot terminal of a relay coil 58 having a set of normally open contacts 58a and a set of normally closed contacts 58b. The other terminal of coil 58 is grounded. Relay 58 is also a "time delay off" relay. Contacts 58a are connected between the hot terminal of coil 58 and the ungrounded lead of starter box 52. The other terminal of starter box 52 is grounded. Normally closed contacts 58b are connected between terminal 54c and contacts 55b which lead to starter box 53.

Figure 2:
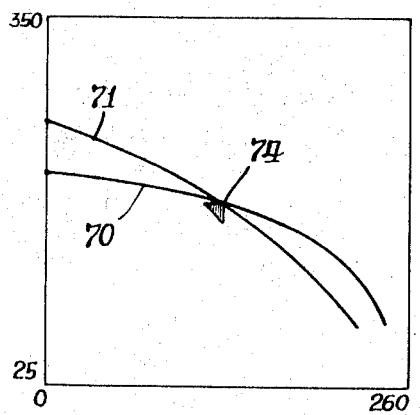
FIG. 2 is a graph illustrating a typical flat head curve and a typical steep head curve.

Turning now to the graph FIG. 2, the abscissa is capacity in gallons per minute and the vertical represents pressure head developed in feet. Characteristics are illustrated for a typical split case pump by curve 70 and for a turbine type steep-head pump by curve 71. Both pumps are designated to pump 140 gallons per minute at a discharge head of 175 feet; known as the duty point 74.

As the flow decreases from the duty point, the discharge pressure increases until at zero flow the pump with a flat-head characteristic 70 reaches a maximum of 200 feet and turbine pump with the steep-head characteristic 71 reaches a maximum of 250 feet. The differential between duty point and shut off head on the flat head curve is 25 feet. The differential between duty point and shut off head on the steep head curve is 75 feet.

This differential in relation to the reservoir volume determines the volume of liquid reserve that can be discharged before reaching the design pressure and necessitating the energizing of a pump.

Prevailing technique calls for an increase in the size of the turbine or steep head pump to gain a large differential. While this can reduce the size of the reservoir, it is wasteful in that a larger pump and motor are required and a larger motor will require a higher energy consumption, thereby adding to the operating cost of the system.

What the present invention does is to add a low-power super charge pump to increase the differential from the discharge head of the lead pump to the shut off head of the super charge pump. A much smaller reservoir is required, resulting in substantial savings in initial investment and operating cost.

Figure 3:
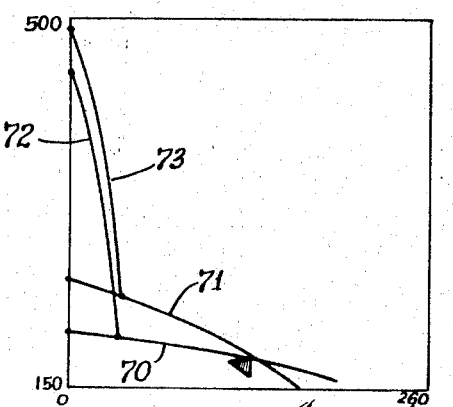
FIG. 3 illustrates combined head-capacity curves for a system incorporating the present invention.

Turning now to FIG. 3 illustrating the same typical flat head curve 70, the same typical steep head curve 71, and the same duty point, the results of including a small super charge pump taking its inlet supply from the outlet of the main pump can be seen. Thus, curves 72 and 73 represent respectively an increase in shut off head from the duty point of 175 feet to 450 feet (when used with flat head curve pump 70) to 485 feet (when used with a steep head curve 71).

As seen schematically in FIG. 1 the super charge pump 14 takes its inlet from outlet of lead pump 12 upstream of check valves 18 and its outlet communicates through check valve 21 with conduit 19 to fill the tank 20. It is apparent that super charge pump 14 could have its inlet communicate directly with inlet conduit 10 and the reservoir size could still be advantageously reduced over what would be called for under prevailing systems.

It is also apparent that super charge pump 14 could have its inlet communicate with other lag pumps with the addition of a check valve between the inlet of pump 14 and the pressure reducing valve 17.

OPERATION

Prior to turning the system on, normally the pressure in the discharge conduit 15 will be below its design level; and the contents of the reservoir will have at least partially exhausted through the pressure regulating valve 16 into the system. Thus, the pressure-sensitive switch 56 sensing pressure within the reservoir 20 will normally be closed. When the system is turned on (as by closing a main switch denoted S in FIG. 1), the relay 55 will be energized to close normally open contacts 55a and to close normally open contacts 55b. Hence, power will be coupled directly from terminal 54c of the secondary winding 54a through the normally closed contact 58b and the closed contact 55b to the starter box 53. When the starter box 53 is energized it will couple the three phase source to the motor 14a which drives the auxiliary pump 14.

At the same instant, power will be directly coupled from terminal 54c of the secondary winding 54a through switch 55a, to starter box 51. When starter box 51 is energized, it will couple the three phase source to the motor 12a which drives the lead pump 12.

Pumps 12 and 14 will supply the system demand via the pressure regulating valve 16 (while filling reservoir 20 via conduit 19) up to 25 percent of the system capacity. At this higher flow lever switch 42 will close and power will be fed to energize the coil 58 and to close normally open contact 58a thereby energizing starter box 52. When starter box 52 is energized; it will couple the three phase source to the motor 13a which drives pump 13. At the same time, when coil 58 is energized it will actuate contacts 58b to de-energize starter box 53 and de-energize motor 14a and stop the auxiliary pump 14.

Pump 13 will supply the system demand above 25 percent in parallel operation with pump 12 to 100 percent system demand. This combination will also fill the reservoir 20 through check valves 18, 22 and conduit 19.

If now the system requirements are reduced below 25 per cent of maximum capacity, first the switch 42 of the flow meter opens to de-energize relay 58. After the predetermined delay, contacts 58a open and contacts 58b close. The opening of contacts 58a de-energizes motor 13a to stop pump 13, and the closing of contacts 58b energizes motor 14 to start the auxiliary pump 14.

Both pumps 12 and 14 will then operate supplying the system requirements and filling the reservoir 20. If system requirements decrease to a level below the preset minimum flow level and the reservoir pressure has built up to a point sufficient to open switch 56, stem 37 of indicator 35 will drop below switch 41 causing the magnetic field to weaken thereby opening switch 41. Pumps 12 and 14 will continue to operate for a predetermined time after coil 55 is de-energized. The time delay serves to prevent rapid cycling of the pumps and to fill the reservoir to a higher pressure and greater useful capacity.

With all pumps off, small requirements in the system will be supplied by the reserve in reservoir 20 through conduit 19 and pressure reducing valve 16.

When pressure in reservoir 20 falls to a point just above designed system pressure, say 3 to 5 pounds, pressure switch 56 will close energizing the coil of relay 55 which will energize motor 12a driving pump 12. Simultaneously normally open contact 55b will close energizing motor 14a driving pump 14.

Persons skilled in the art will appreciate that one important advantage of the present invention is that it permits the use of a small super charge pump to build up the pressure in the reservoir allowing the reduction in the physical size of the reservoir for the same usable capacity of water storage than would be possible if a larger main pump with steep head or a flat head curve were used.

Another advantage of the present invention is that it permits the use of split case pumps which have a flat head characteristic in a reservoir system where they have not been successfully used before. This substantially reduces system costs.

Still another important advantage to the present system, in addition to those already mentioned, is that it avoids oversizing of the main pumps to obtain greater pressure differential from design to shut-off head. By properly sizing the main pumps to design conditions and using a super charge pump to develop maximum differential pressure, initial cost and operating cost are substantially reduced.

As an example illustrating the merits of the invention, a comparison will be made for the different sizes of reservoir in order to maintain a useful reservoir capacity of 20 gallons. In a two-pump system with the lead pump having a shut-off head of 89 psi. and maintaining a constant system pressure of 80 psi., a reservoir of 225 gallons is required. When a super charge pump is added to the same system having a shut-off head of 138 psi., the size of the reservoir is reduced to 55 gallons to supply the same usable capacity of 20 gallons. In this example, the lead pump would operate up to 65 percent of full capacity, and both main pumps would operate simultaneously thereafter.

Having thus described in detail a preferred embodiment of the inventive system together with certain modifications, persons skilled in the art will be able to modify certain of the structure described and to substitute equivalent elements for those which have been disclosed without departing from the inventive principle; and it is, therefore, intended that all such modifications

We claim:

1. A water-pressure booster system for taking water from an inlet conduit and forcing it under pressure to a discharge conduit comprising a plurality of main pump means each including a drive motor; control circuit means including flow responsive means sensing flow through said system for sequencing said main pump means in a predetermined order responsive to flow levels in said system when system flow is above a predetermined minimum flow level; pressurized reservoir means coupled to the output of at least one of said main pump means and adapted to discharge into said discharge conduit; pressure responsive switch means sensing pressure in said reservoir means and connected in circuit with said control circuit means for de-energizing all of said main pump means only when the pressure in said tank is above a predetermined high pressure value above system design pressure and the flow in said system is below said predetermined minimum flow level; and an auxiliary pump means including a drive motor and having a high head characteristic connected to charge said tank to a pressure higher than said predetermined high pressure, said control circuit means energizing both said main pump means and said auxiliary pump pump means in response to said flow responsive means sensing flow between said predetermined minimum flow level and a second predetermined flow level higher than said minimum flow level.

2. The system of claim 1 wherein said main pump means comprises a first main pump and a second main pump, each including an associated drive motor.

3. The system of claim 1 further comprising pressure regulating means interposed between the discharge conduit and the outlet of said pumps for maintaining constant system pressure.

4. The system of claim 3 wherein said auxiliary pump means has its suction inlet connected to the outlet of said main pump means and its outlet connected to the inlet of said reservoir, and wherein said system further includes a check valve between the outlet of said main pump means and said pressure regulating means whereby all of said main pump means, said auxiliary pump means and said tank all feed said pressure regulating means.

5. The system of claim 2 wherein said control circuit means energizes said second pump in parallel with said first pump when said system flow exceeds said second predetermined flow level; said control circuit means also de-energizing said auxiliary pump when said system demand is above said second flow level.

6. A water-pressure booster system comprising main pump means including a drive motor for taking water from an inlet conduit and pumping said water to a discharge conduit; pressure regulating means interposed between said discharge conduit and the outlet of said main pump means to maintain the pressure in said discharge conduit at a predetermined discharge pressure level; a pressurized water reservoir connected to discharge through said pressure regulating means; wherein the improvement comprises: auxiliary pump means including a drive motor and having a steep head characteristic at low volume and connected to charge said pressurized water reservoir; and control circuit means including a pressure responsive switch sensing the pressure in said reservoir for energizing said auxiliary pump means when the pressure in said reservoir is below a predetermined pressure level, said predetermined pressure level being higher than the discharge pressure level which said system is designed to provide.

7. The system of claim 6 wherein said pressure responsive switch further generates a high pressure signal when the pressure in said reservoir is above a predetermined high pressure level; and wherein said control circuit means further comprises flow means sensing flow into said main pump means and connected in circuit with said pressure responsive switch to de-energize said main pump means and said auxiliary pump means when the flow through said system falls below a predetermined minimum flow level and the pressure in said tank exceeds said predetermined high pressure level.

8. The system of claim 7 further comprising timer means for delaying the shutting off of said main pump means and said auxiliary pump means in response to the aforementioned conditions for a predetermined time, thereby to charge said reservoir to a higher pressure for supplying additional capacity to said system.

9. A pressure booster system comprising: at least a first and a second main pump; each having an associated drive motor; a pressurized water reservoir having an inlet/outlet communicating with the outputs of both of said main pumps; pressure regulating means communicating the outputs of said pumps and the inlet/outlet of said reservoir with a discharge conduit; an auxiliary pump having a steep head characteristic at low flow rates and having its outlet connected to the inlet/outlet of said reservoir upstream of said pressure regulating means; a pressure responsive switch sensing the pressure in said reservoir for generating a first signal when said pressure exceeds a predetermined high pressure level above the design pressure for said discharge conduit and for generating a second signal when the pressure in said tank falls below a predetermined low pressure level above said design pressure; flow means sensing to the flow in an inlet conduit and responsive to a predetermined minimum flow condition therein; and control circuit means for energizing said first main pump in response to said second signal generated by said pressure responsive means in said reservoir, said control circuit means de-energizing all of said pumps in response to said second signal generated by said flow responsive means and in further response to the predetermined minimum flow conditions sensed by said flow means.

* * * * *